United States Patent [19]
Osaka

[11] 4,398,215
[45] Aug. 9, 1983

[54] VIDEO SIGNAL PROCESSING SYSTEM
[75] Inventor: Hiroshi Osaka, Toda, Japan
[73] Assignee: Clarion Co., Ltd., Tokyo, Japan
[21] Appl. No.: 182,330
[22] Filed: Aug. 28, 1980
[30] Foreign Application Priority Data
  Sep. 3, 1979 [JP] Japan .................................. 54-111695
[51] Int. Cl.³ ............................................. H04N 7/16
[52] U.S. Cl. .................................... 358/120; 358/124
[58] Field of Search ................................ 358/120, 124
[56] References Cited
  U.S. PATENT DOCUMENTS
  3,439,113  4/1969  Walker ................................. 358/124
  3,527,877  9/1970  Walker ................................. 358/124
  3,801,732  4/1974  Reeves ................................ 358/124

FOREIGN PATENT DOCUMENTS
  1163836  9/1969  United Kingdom ................ 358/124

Primary Examiner—S. C. Buczinski
Attorney, Agent, or Firm—Harris, Kern, Wallen & Tinsley

[57] ABSTRACT

A video signal processing system in which a synchronizing signal component of a television video signal is inverted with reference to a pedestal level and expanded higher than a video component and horizontal synchronizing signals are reduced so that each of the horizontal synchronizing signals may correspond to plural lines.

7 Claims, 3 Drawing Figures

VIDEO SIGNAL PROCESSING SYSTEM

BACKGROUND OF THE INVENTION

This invention relates to a television video signal processing system, and more particularly to a video signal processing system suitable for a wireless pay-television system in which, to provide special programs only to subscribers who make regular payments for the service, the programs are broadcast in coded or scrambled form requiring a decoding or unscrambling device at the receiver to reproduce the programs on a common TV-set.

A so-called wireless pay-TV system, to which the present invention is applicable, has been developed to eliminate annoying commercial messages indispensable to ordinary commercial broadcasting and possible degradation of program quality due to various restrictions inherent to the commercial broadcasting. This wireless system is expected to be spread wide because expenses and time required for laying cables can be curtailed and there is no limitation in number of subscribers.

In general, in the wireless pay-TV system, a video signal and/or an aural signal is coded or scrambled so that the system may be applied only to the subscribers of the system, excluding non-subscribers.

OBJECT OF THE INVENTION

It is an object of the present invention to provide a novel video signal processing system for coding a video signal and decoding the coded signal into the original signal.

SUMMARY OF THE INVENTION

In accordance with the present invention, there is provided a video signal processing system in a wireless pay-television system wherein a television video signal is encoded by an encoder, the coded signal is transmitted to subscribers' ends, and the coded signal received at the subscribers' ends is decoded into an ordinary video signal by decoders, which system is characterized in that said encoder processes and encodes the television video signal by inverting a synchronizing signal component thereof with reference to a pedestal level and expanding said component higher than a video component and by reducing horizontal synchronizing signal components so that each of the horizontal synchronizing signal components may correspond to plural lines.

DESCRIPTION OF PREFERRED EMBODIMENT

Figure 1:
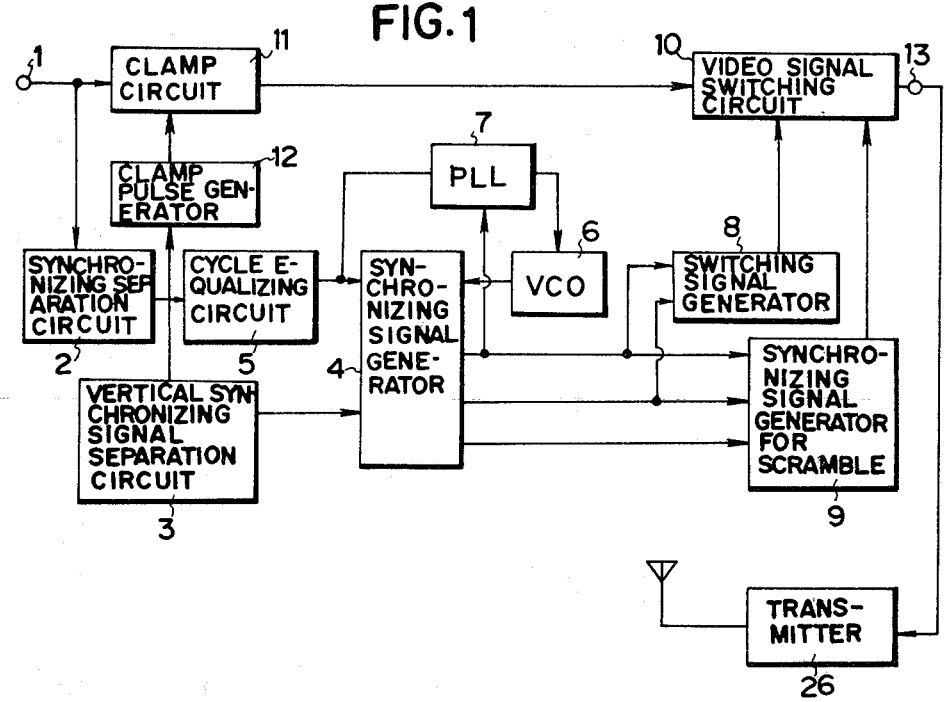
FIG. 1 is a block diagram of one form of an encoder in accordance with the present invention.

Referring now to FIG. 1, there is illustrated a preferred form of an encoder for encoding a video signal in accordance with the present invention. In the figure, 1 is an input terminal for an unencoded video signal, 2 a synchronizing separation circuit, 3 a vertical synchronizing signal separation circuit, 4 a synchronizing signal generator, 5 a cycle equalizing circuit, 6 a voltage-controlled oscillator, 7 a phase-locked loop circuit, 8 a switching signal generator, 9 a synchronizing signal generator for scrambling, 10 a video signal switching circuit, 11 a clamping circuit, 12 a clamping pulse generator, and 13 an output terminal for encoded video signal.

Figure 2:
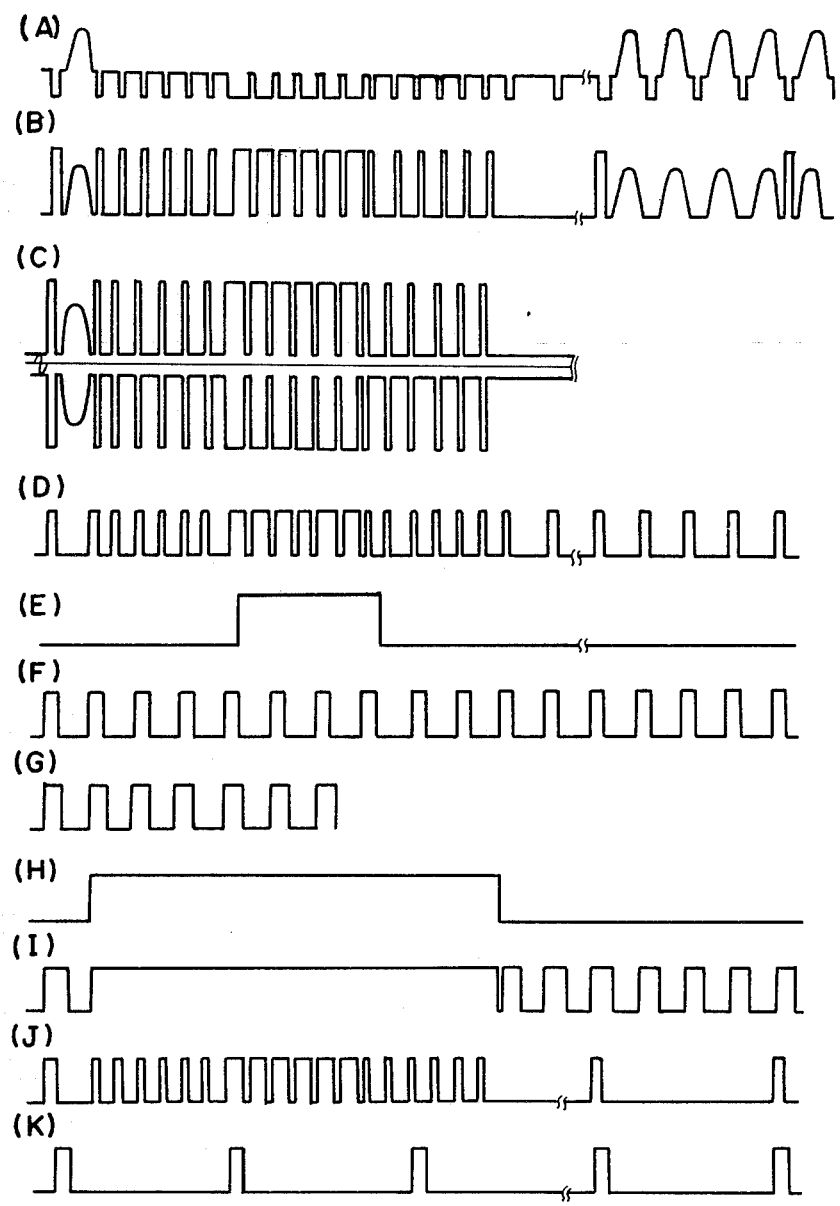
FIG. 2 is a timing chart for explaining an operation of the encoder illustrated in FIG. 1.

In the so formed encoder, when an unencoded video signal as illustrated by FIG. 2(a) is supplied to the input terminal 1, only a composite synchronizing signal of FIG. 2(d) is separated therefrom by the synchronizing separation circuit 2. This composite synchronizing signal drives the vertical synchronizing signal separation circuit 3 to produce a vertical synchronizing signal of FIG. 2(e) which in turn drives the synchronizing signal generator 4. At the same time, the composite synchronizing signal drives the cycle equalizing circuit 5. The circuit 5 produces a continuous wave signal having a regular cycle equal to that of a horizontal synchronizing signal even in a portion of the composite synchronizing signal such as a vertical synchronizing signal portion including equalizing pulses wherein the cycle of pulses differs from that of the horizontal synchronizing signal, for driving the synchronizing signal generator 4. The synchronizing signal generator 4 is supplied, as inputs, with the vertical synchronizing signal, the continuous wave signal having a cycle equal to that of the horizontal synchronizing signal and a clock and produces various signals required for generating a television signal such as a horizontal drive signal of FIG. 2(g), a vertical drive signal of FIG. 2(h), the composite synchronizing signal, etc. As a clock source for the synchronizing signal generator 4, the voltage-controlled oscillator 6 is used. Oscillation of the oscillator 6 is to be precisely in synchronism with integral multiple of the horizontal drive signal. For this reason, the output of the cycle equalizing circuit 5 and the horizontal drive signal of the synchronizing signal generator 4, are applied to the phase-locked loop circuit 7. The phase-locked loop circuit 7 produces a voltage proportional to a phase difference between the two input signals, and the voltage is fed back to the voltage-controlled oscillator 6 so that the oscillation voltage is synchronized with the integral multiple of the horizontal drive signal. Thus, the outputs from the synchronizing signal generator 4, i.e., the horizontal drive signal, the vertical drive signal and the composite synchronizing signal have the same frequencies and phases as the video signal supplied to the input terminal 1.

The horizontal drive signal and the vertical drive signal are applied to the switching signal generator 8 to produce a switching signal of FIG. 2(i). A pulse duration of the switching signal is selected so as to cover the horizontal synchronizing signal and the vertical synchronizing signal including the equalizing pulses but exclude a color burst signal and a video signal component. The horizontal drive signal is further applied to the scrambling synchronizing signal generator 9. The generator 9 has a frequency divider and mixes the horizontal synchronizing signal having a frequency of the horizontal drive signal divided by an integer and vertical pulses including the equalizing pulses to produce a scrambling synchronizing signal for application to the video signal switching circuit 10.

The video signal switching circuit 10 is applied with the video signal through the clamping circuit 11 and driven by an output from the switching signal generator 8. According to the switching signal of FIG. 2(i), the video signal switching apparatus 10 operates so as to select an output from the scrambling synchronizing signal generator 9 when an output of the switching signal generator 8 is high and the video signal when the output of the generator 8 is low. To assure a desired operation of the video signal switching circuit 10, the clamping circuit 11 is driven by an output from the clamping pulse generator 12 to carry out preliminary DC restoration of the video signal inputted to the video signal switching circuit 10. Thus, coded video signal is obtained through the output terminal 13.

The so obtained coded video signal has a waveform as illustrated in FIG. 2(b). As apparent from the figure, this waveform is provided in such a manner that the synchronizing signal of the unencoded video signal is inverted with reference to a pedestal level and expanded higher than a video component and horizontal synchronizing pulses are reduced so as to correspond one horizontal synchronizing pulse to plural lines. This coded video signal is transmitted by a transmitter 26 in a polarity which increases a power at a white portion of the video signal as illustrated by FIG. 2(c), so that an ordinary television receiver cannot reproduce the signal into a proper picture.

Figure 3:
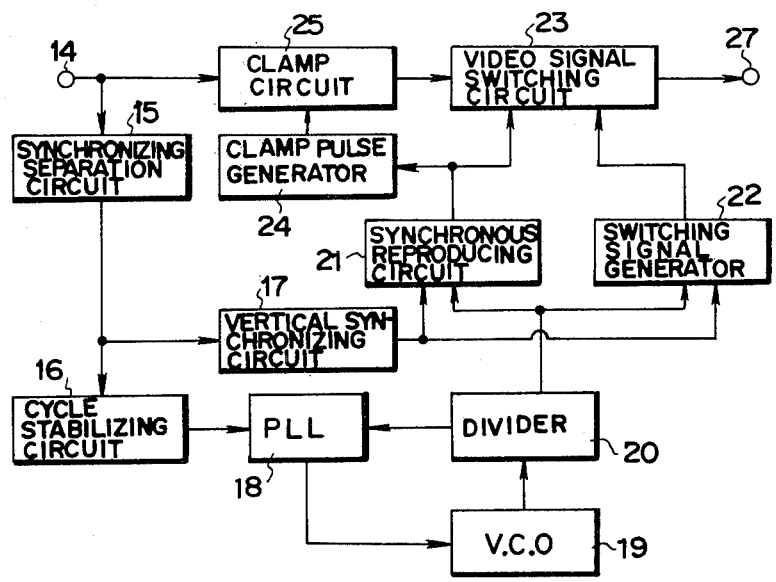
FIG. 3 is a block diagram of one form of a decoder in accordance with the present invention.

FIG. 3 illustrates a decoder for decoding the coded video signal in accordance with the present invention.

In FIG. 3, 14 is an input terminal, 15 a synchronizing separation circuit, 16 a cycle stabilizing circuit, 17 a vertical synchronizing signal separation circuit, 18 a phase-locked loop circuit, 19 a voltage-controlled oscillator, 20 a frequency divider, 21 a synchronous reproducing circuit, 22 a switching signal generator, 23 a video signal switching circuit, 24 a clamping pulse generator, 25 a clamping circuit and 27 an output terminal.

A coded or scrambled signal supplied to the input terminal 14 is subjected to separation at the synchronizing separation circuit 15 to separate a synchronizing signal having a waveform of FIG. 2(j) for driving the cycle stabilizing circuit 16 and the vertical synchronizing signal separation circuit 17. This cycle stabilizing circuit 16 produces a continuous wave signal of FIG. 2(k) having a cycle equal to that of a horizontal synchronizing component from the horizontal synchronizing component and vertical synchronizing component having different cycles as illustrated in FIG. 2(j). The continuous wave signal is applied to the phase-locked loop circuit 18 as a reference input signal.

The voltage-controlled oscillator 19 is provided in the phase-locked loop and an output frequency thereof is divided by an integer by a frequency divider 20. The phase-locked loop circuit 18 produces a voltage proportional to a phase difference between an output of the cycle stabilizing circuit 16 and an output of the frequency divider 20, and the voltage is fed back to the voltage-controlled oscillator 19 so that the continuous wave signal may have a frequency integral multiple of that of an output signal from the cycle stabilizing circuit 16 and a phase synchronized with that of the output signal therefrom. Thus, a signal having a frequency and a phase identical with those of the horizontal synchronizing component of the television signal can be obtained in the middle of the frequency dividing stages. Outputs of the frequency divider 20 and the vertical synchronizing signal separation circuit 17 are applied to the synchronous reproducing circuit 21 to produce a composite synchronizing signal having a waveform of FIG. 2(d). The signal derived from the middle course of the frequency dividing stages of the frequency divider 20 and the output signal from the vertical synchronizing signal seperation circuit further drive the switching signal generator 22 to produce a switching signal having a waveform of FIG. 2(i) and drive the video signal switching circuit 23.

The video signal switching circuit 23 receives the output from the synchronous reproducing circuit 21 and the coded video signal and operates in such a manner that it selects the output of the synchronous reproducing circuit 21 when this output is at a high level and the coded video signal when the output is at a low level. To assure proper operation of the video signal switching apparatus 23, the clamping circuit 25 is driven by an output of the clamping pulse generator 24 to preliminarily carry out DC restoration of the video signal inputted to the video signal switching apparatus 23 and output a decoded video signal through the output terminal 27.

As apparent from the foregoing description, in accordance with the present invention, the television signal may be transmitted in coded or scrambled form which requires a decoder or unscrambling device to reproduce the television program. Thus, this novel video signal processing system of the present invention is suitable as a system for a pay-television system.

I claim:

1. A video signal processing system in a wireless pay-television system wherein a television video signal is encoded by an encoder, the coded signal is transmitted to subscribers' ends, and the coded signal received at the subscribers' ends is decoded into an ordinary video signal by decoders, said video signal having a video component and a synchronizing signal component, which system is characterized in that said encoder processes and encodes the television video signal by inverting said synchronizing signal component thereof with reference to a pedestal level and amplifying said synchronizing signal component so that it is higher than said video component and by reducing the number of horizontal synchronizing signal components so that one of the horizontal synchronizing signal components remains for a plurality of lines, said encoder comprising:

a synchronizing separation circuit for separating a composite synchronizing signal from the television video signal;

a vertical synchronizing signal separating circuit driven by the composite synchronizing signal to produce a vertical synchronizing signal;

a cycle equalizing circuit driven by the composite synchronizing signal to produce a continuous wave signal having a cycle equal to that of a horizontal synchronizing signal;

a clock signal generating circuit for producing a clock signal;

a synchronizing signal generating circuit responsive to the vertical synchronizing signal, the continuous wave signal and the clock signal to produce at least a horizontal drive signal, a vertical drive signal and the composite synchronizing signal;

a switching signal generating circuit for producing a switching signal in response to the horizontal and vertical drive signals, a pulse duration of the switching signal being selected so as to cover the horizontal synchronizing signal and the vertical synchronizing signal including the equalizing pulses in said composite synchronizing signal but exclude a color burst signal and the video signal component;

a scrambler signal generating circuit responsive to the horizontal drive signal, the vertical drive signal and the composite synchronizing signal for mixing the horizontal synchronizing signal having a frequency of the horizontal drive signal divided by an integer and the vertical synchronizing signal including the equalizing pulses to produce a scrambling synchronizing signal; and a video signal switching circuit driven by the switching signal to selectively output the video signal or the scrambling synchronizing signal.

2. A video signal processing system as claimed in claim 1, wherein said clock signal generating circuit includes a phase-locked loop circuit for producing a voltage responsive to a phase difference between the continuous wave signal and the horizontal drive signal.

3. A video signal processing system as claimed in claim 1 or 2, wherein said encoder further comprises a clamping circuit, through which the video signal is applied to said video signal switching circuit, and a clamping pulse generating circuit for producing a clamping pulse to drive said clamping circuit.

4. A video signal processing system as claimed in claim 1, wherein said decoder comprises:
- a synchronizing separation circuit for seperating a synchronizing signal from the coded video signal;
- a cycle stabilizing circuit driven by the synchronizing signal to produce a continuous wave signal having a cycle equal to that of the horizontal synchronizing component of the video signal;
- a vertical synchronizing signal separation circuit driven by the synchronizing signal;
- a phase-locked loop circuit for obtaining a signal having a frequency and a phase same as those of the horizontal synchronizing component from the output of said cycle stabilizing circuit;
- a switching signal generating circuit driven by an output of said phase-locked loop circuit and an output of said vertical synchronizing signal separation circuit for producing a switching signal;
- a synchronous reproducing circuit driven by the output of said vertical synchronizing signal separation circuit and the output of said phase-locked loop circuit; and
- a video signal switching circuit driven by the switching signal to selectively output the coded video signal or an output of said synchronous reproducing circuit.

5. A video signal processing system as claimed in claim 3, wherein said decoder comprises:
- A synchronizing separation circuit for separating a synchronizing signal from the coded video signal;
- a cycle stabilizing circuit driven by the synchronizing signal to produce a continuous wave signal having a cycle equal to that of the horizontal synchronizing component of the video signal;
- a vertical synchronizing signal seperation circuit driven by the synchronizing signal;
- a phase-locked loop circuit for obtaining a signal having a frequency and a phase same as those of the horizontal synchronizing component from the output of said cycle stabilizing circuit;
- a switching signal generating circuit driven by an output of said phase-locked loop circuit and an output of said vertical synchronizing signal separation circuit for producing a switching signal;
- a synchronous reproducing circuit driven by the output of said vertical synchronizing signal separation circuit and the output of said phase-locked loop circuit; and
- a video signal switching circuit driven by the switching signal to selectively output the coded video signal or an output of said synchronous reproducing circuit.

6. A video signal processing system as claimed in claim 1, wherein said decoder comprises:
- a synchronizing separation circuit for separating a synchronizing signal from the coded video signal;
- a cycle stabilizing circuit driven by the synchronizing signal to produce a continuous wave signal having a cycle equal to that of the horizontal synchronizing component of the video signal;
- a vertical synchronizing signal seperation circuit driven by the synchronizing signal;
- a phase-locked loop circuit for obtaining a signal having a frequency and a phase same as those of the horizontal synchronizing component from the output of said cycle stabilizing circuit;
- a switching signal generating circuit driven by an output of said phase-locked loop circuit and an output of said vertical synchronizing signal separation circuit for producing a switching signal;
- a synchronous reproducing circuit driven by the output of said vertical synchronizing signal separation circuit and the output of said phase-locked loop circuit;
- a video signal switching circuit driven by the switching signal to selectively output the coded video signal or an output of said synchronous reproducing circuit;
- a clamping circuit through which the coded video signal is applied to said video signal switching circuit, and
- a clamping pulse generating circuit for producing a clamping pulse to drive said clamping circuit.

7. A video signal processing system as claimed in claim 3, wherein said decoder comprises:
- a synchronizing separation circuit for separating a synchronizing signal from the coded video signal;
- a cycle stabilizing circuit driven by the synchronizing signal to produce a continuous wave signal having a cycle equal to that of the horizontal synchronizing component of the video signal;
- a vertical synchronizing signal separation circuit driven by the synchronizing signal;
- a phase-locked loop circuit for obtaining a signal having a frequency and a phase same as those of the horizontal synchronizing component from the output of said cycle stabilizing circuit;
- a switching signal generating circuit driven by an output of said phase-locked loop circuit and an output of said vertical synchronizing signal seperation circuit for producing a switching signal;
- a synchronous reproducing circuit driven by the output of said vertical synchronizing signal separation circuit and the output of said phase-locked loop circuit;
- a video signal switching circuit driven by the switching signal to selectively output the coded video signal or an output of said synchronous reproducing circuit;
- a clamping circuit through which the coded video signal is applied to said video signal switching circuit, and
- a clamping pulse generating circuit for producing a clamping pulse to drive said clamping circuit.

* * * * *